(12) United States Patent
Vergara et al.

(10) Patent No.: US 7,293,825 B2
(45) Date of Patent: Nov. 13, 2007

(54) MULTI-POSITION CHAIR

(75) Inventors: Alexander Vergara, Concord, NH (US); Harold Turner, Goffstown, NH (US)

(73) Assignee: Advantage Branch & Office Systems, LLC, Concord, NH (US)

( * ) Notice: Subject to any disclaimer, the term of this patent is extended or adjusted under 35 U.S.C. 154(b) by 55 days.

(21) Appl. No.: 11/224,725

(22) Filed: Sep. 12, 2005

(65) Prior Publication Data

US 2006/0103177 A1   May 18, 2006

Related U.S. Application Data

(60) Provisional application No. 60/608,821, filed on Sep. 10, 2004.

(51) Int. Cl.
*A47C 13/00* (2006.01)
*A47C 1/00* (2006.01)
*A47C 1/024* (2006.01)
*A47C 1/032* (2006.01)
*A47C 7/18* (2006.01)

(52) U.S. Cl. .................. 297/1; 297/94; 297/112; 297/118; 297/130; 297/283.1; 297/283.3; 297/378.1; 297/423.11; 297/423.12; 297/452.27; 297/313; 297/316; 297/320; 297/325

(58) Field of Classification Search ............ 297/1, 297/94, 112, 118, 130, 283.1, 283.3, 378.1, 297/423.11, 423.12, 452.26, 452.27, 313, 297/316, 320, 325
See application file for complete search history.

(56) References Cited

U.S. PATENT DOCUMENTS

| | | | | |
|---|---|---|---|---|
| 439,989 A | * | 11/1890 | Whiteley | .......... 297/112 |
| 948,480 A | * | 2/1910 | Wiley | ............. 297/94 X |
| 2,666,210 A | * | 1/1954 | Wiley | ............ 297/118 X |
| 2,672,921 A | * | 3/1954 | Herrick | ............ 297/118 X |
| 2,705,994 A | * | 4/1955 | Stattler | ............ 297/112 X |
| 3,004,792 A | * | 10/1961 | Bell | ............... 297/118 |
| 3,330,596 A | * | 7/1967 | Wells et al. | .......... 297/93 |
| 3,511,533 A | * | 5/1970 | Drabert | ............. 297/337 |
| 3,530,954 A | * | 9/1970 | Schmidt | ........... 297/118 X |
| 4,198,094 A | * | 4/1980 | Bjerknes et al. | ....... 297/300.4 |
| 4,521,052 A | * | 6/1985 | Cone | ............... 297/1 X |
| 4,534,590 A | * | 8/1985 | Yamamura et al. | ..... 297/118 X |
| 4,552,404 A | * | 11/1985 | Congleton | ........... 297/330 |

(Continued)

FOREIGN PATENT DOCUMENTS

CH            675194 A  *  9/1990   ................. 297/338

(Continued)

*Primary Examiner*—Rodney B. White
(74) *Attorney, Agent, or Firm*—Grossman Tucker Perreault & Pfleger, PLLC

(57) ABSTRACT

A multi-position chair may be positioned into multiple positions including one or more sitting positions at different heights, one or more leaning positions at different angles, and one or more storage positions. The multi-position chair may include a seat, a back and a support for supporting the seat and the back with respect to the floor. The seat and the back may be pivotable with respect to each other and with respect to the support. The seat includes a seating surface configured to receive the user's buttocks in a sitting position. The back may include a front seating surface configured to receive the user's back in a sitting position and a rear leaning surface configured to receive the user's buttocks in a leaning position.

18 Claims, 5 Drawing Sheets

U.S. PATENT DOCUMENTS

| | | | | |
|---|---|---|---|---|
| 4,614,378 A | * | 9/1986 | Picou | 297/118 X |
| 4,682,818 A | * | 7/1987 | Morell | 297/452.27 |
| 4,696,516 A | * | 9/1987 | Yeum | 297/452.27 X |
| 4,736,982 A | * | 4/1988 | Hwang | 297/118 |
| 4,753,480 A | * | 6/1988 | Morell | 297/452.27 |
| 4,793,655 A | * | 12/1988 | Kvalheim et al. | 297/118 X |
| 4,832,407 A | * | 5/1989 | Serber | 297/423.12 |
| 4,934,303 A | * | 6/1990 | Lathers et al. | 297/313 X |
| 5,048,893 A | * | 9/1991 | Cowan et al. | 297/313 X |
| 5,054,857 A | * | 10/1991 | Kvalheim | 297/423.13 |
| 5,149,174 A | * | 9/1992 | Charash | 297/423.12 |
| 5,154,472 A | * | 10/1992 | Kaufman | 297/316 X |
| 5,189,747 A | * | 3/1993 | Mundy et al. | 297/452.27 X |
| 5,199,763 A | * | 4/1993 | Wilder et al. | 297/338 |
| 5,255,957 A | * | 10/1993 | Opsvik et al. | 297/423.12 |
| 5,295,728 A | * | 3/1994 | Schaevitz | 297/423.12 X |
| 5,542,746 A | * | 8/1996 | Bujaryn | 297/423.12 |
| 5,619,949 A | * | 4/1997 | Dick, Jr. | 297/338 X |
| 5,630,648 A | * | 5/1997 | Allard et al. | 297/313 X |
| 5,658,047 A | * | 8/1997 | Ratza et al. | 297/378.1 X |
| 5,667,278 A | * | 9/1997 | Li | 297/423.11 X |
| 5,857,747 A | * | 1/1999 | Mundkowski | 297/423.11 |
| 6,089,669 A | * | 7/2000 | Wilcox et al. | 297/378.1 X |
| 6,109,694 A | * | 8/2000 | Kurtz | 297/320 |
| 6,116,682 A | * | 9/2000 | Baur | 297/378.1 X |
| 6,431,649 B1 | * | 8/2002 | Hensel | 297/316 X |
| 6,464,300 B2 | * | 10/2002 | Grove | 297/378.1 X |
| 6,554,353 B1 | * | 4/2003 | Yu | 297/130 |
| 6,578,918 B1 | * | 6/2003 | Rinne et al. | 297/320 |
| 6,578,919 B2 | * | 6/2003 | Seibold et al. | 297/378.1 X |
| 6,663,174 B2 | * | 12/2003 | Drage et al. | 297/112 |
| 6,733,083 B1 | * | 5/2004 | Landvik et al. | 297/452.26 |
| 6,783,179 B2 | * | 8/2004 | Komura et al. | 297/330 X |
| 6,824,149 B1 | * | 11/2004 | Whitlock et al. | 297/118 X |
| 7,090,303 B2 | * | 8/2006 | Kropa | 297/423.12 X |
| 2003/0151288 A1 | * | 8/2003 | Deisig | 297/313 |

FOREIGN PATENT DOCUMENTS

| | | | | |
|---|---|---|---|---|
| DE | 3400136 A1 | * | 7/1985 | 297/313 |
| DE | 3933815 A1 | * | 4/1991 | 297/325 |
| DE | 4132280 A1 | * | 4/1993 | 297/94 |
| DE | 4306918 A1 | * | 9/1994 | 297/118 |
| EP | 179748 A2 | * | 4/1986 | 297/378.1 |
| GB | 2176396 A | * | 12/1986 | 297/423.12 |
| WO | WO8804903 A1 | * | 7/1988 | 297/118 |
| WO | WO8906101 A1 | * | 7/1989 | 297/313 |
| WO | WO9221270 A1 | * | 12/1992 | 297/118 |
| WO | WO9401050 A1 | * | 1/1994 | 297/327 |

* cited by examiner

MULTI-POSITION CHAIR

CROSS-REFERENCE TO RELATED APPLICATIONS

This application claims the benefit of co-pending U.S. Provisional Patent Application Ser. No. 60/608,821, filed on Sep. 10, 2004, which is fully incorporated herein by reference. This application is also related to co-pending U.S. patent application Ser. No. 11/224,698 entitled CUSTOMER INTERACTION PROCESS AND SYSTEM and U.S. patent application Ser. No. 11/224,724 entitled CUSTOMER INTERACTION CONSOLE AND CONFIGURABLE CONSOLE SYSTEM, both of which are filed concurrently herewith and are fully incorporated herein by reference.

TECHNICAL FIELD

The present invention relates to chairs and more particularly, a multi-position chair.

BACKGROUND INFORMATION

A successful business may depend on the office environment in which the business' employees work and in which customers interact with the business. Employees are generally more productive in a safe and comfortable workplace and in a rewarding job. Customers are generally more satisfied when interacting with pleasant employees in an efficient and customer-friendly manner. Existing office environments and processes for customer interaction have some shortcomings that result in unhappy employees and unhappy customers and as a result, a less successful business.

The traditional office environment is often uncomfortable for the workers and in some cases, may cause work-related disorders or injuries. The teller's console in a bank office, for example, may not allow the teller to work comfortably and effectively. Working in confined spaces where the number of physical positions available to the worker is restricted may lead to musculoskeletal disorder (MSD). Such injuries or disorders may lead to job dissatisfaction, absenteeism and worker's compensation claims. Devices such as stools have been developed to allow bank tellers, and others who work in confined spaces, to sit or stand during a workday. Although current stools may allow some adjustment and ergonomic advantages, the available adjustments may not allow the operator to perform the job functions effectively and the devices may not fit within the limited physical space available.

BRIEF DESCRIPTION OF THE DRAWINGS

These and other features and advantages will be better understood by reading the following detailed description, taken together with the drawings wherein.

DETAILED DESCRIPTION

Figure 1:
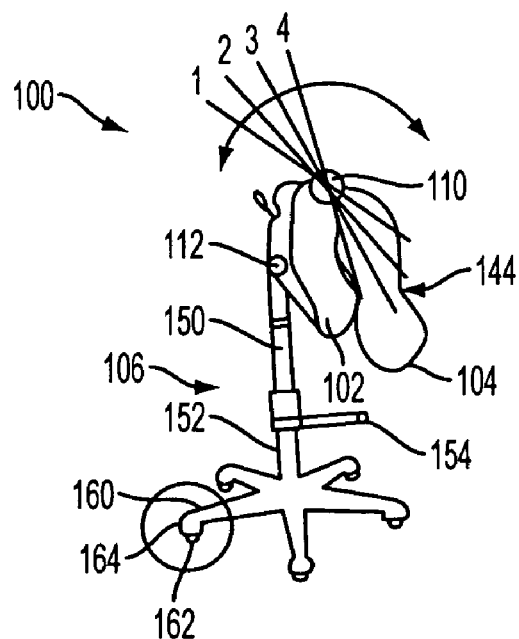
FIGS. 1-4 are side views of a multi-position chair in various positions, consistent with one embodiment of the present invention.

Referring to FIGS. 1-4, a multi-position chair 100 is described in greater detail. The multi-position chair 100 is configured to be positioned into multiple positions including one or more sitting positions at different heights, one or more leaning positions at different angles, and one or more storage positions. The different sitting and leaning positions enable the worker or employee to use multiple physical positions during the work day, which may reduce or eliminate disorders such as MSD. The storage position(s) provide additional workspace when the worker is standing instead of sitting or leaning.

The multi-position chair 100 includes a seat 102, a back 104 and a support 106 for supporting the seat 102 and back 104 with respect to the floor. The seat 102 and the back 104 may be pivotable with respect to each other and with respect to the support 106 to allow the chair 100 to be moved into the different positions. In one embodiment, the multi-position chair 100 may include a pivot mechanism 110 coupled between the seat 102 and the back 104 and a pivot mechanism 112 between the seat 102 and the support 106. The pivot mechanisms 110, 112 may also include locking mechanisms (not shown) to lock in multiple positions. The pivot mechanisms 110, 112 may include conventional pivot or swivel mechanisms known to those skilled in the art.

The support 106 may secure the chair 100 with respect to the floor so that the chair 100 remains stable, for example, when used in one of the leaning positions. The support 106 may include a vertical adjustment mechanism (not shown) to vertically adjust the height of the chair 100. The vertical adjustment mechanism 120 may include a conventional hydraulic adjustment mechanism such as the type known to those skilled in the art for use in office chairs.

According to one embodiment, the seat 102 includes a seating surface 132 on one side of the seat 102, which is configured to receive the user's buttocks. The back 104 may include a front seating surface 142 on one side of the back 104 and a rear leaning surface 144 on another side. The front seating surface 142 is configured to receive the user's back when seated, and the rear leaning surface 144 is configured to receive the user's buttocks when leaning.

Figure 2:
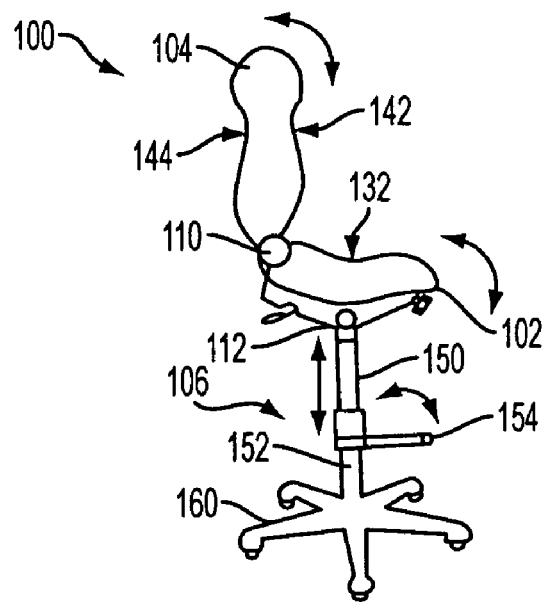
Figure 3:
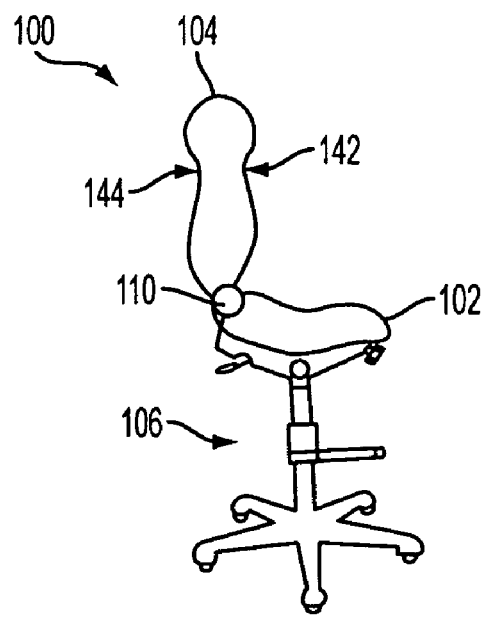

In the sitting position(s) (e.g., as shown in FIGS. 2 and 3), the seat 102 and back 104 may be arranged such that the seating surface 132 on the seat 102 receives the user's buttocks and the front seating surface 142 on the back 104 receives the user's back. The seat 102 and back 104 may be adjustable vertically to change the height of the sitting position, for example, between counter height and desk height. FIG. 2 shows one example of a higher sitting position and FIG. 3 shows one example of a lower sitting position. The depth and tilt of the seat 102 may also be adjusted for various sitting positions. In one sitting position, the seat 102 may be adjusted such that the user's hips are higher than the user's knees to provide a recommended ergonomically correct seating posture.

In the leaning position(s) (e.g., as shown in FIG. 1), the seat 102 and back 104 are folded together and arranged such that the rear leaning surface 144 of the back 104 receives the user's buttocks when the user leans against the chair 100. The folded together seat 102 and back 104 may be pivoted in a range of angles (e.g., 180°) to provide a range of leaning positions and for a variety of weight distributions relative to the pelvic area and the legs of the user. The folded together seat 102 and back 104 may also be adjustable vertically to provide the desired height for leaning (e.g., depending upon the user's height). According to another leaning position, the seat 102 and the back 104 may be in a generally horizontal position to allow the user to perch on the edge of the back 104.

Figure 4:
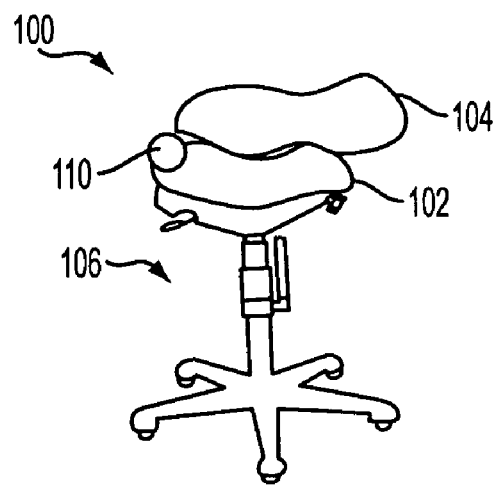

In the storage position(s) (e.g., as shown in FIG. 4), the seat 102 and back 104 are folded together and arranged such that the chair may be easily stored, for example, beneath the console. The folded together seat 102 and back 104 may be in a generally horizontal position or in an angled position (e.g., similar to the leaning position). In the storage position, the folded together seat 102 and back 104 may also be lowered to a lower height.

The multi-position chair 100 advantageously allows the user to vary his or her physical position throughout the workday, thereby reducing or totally mitigating the likelihood of being effected by MSD. The multi-position chair 100 may also be advantageously designed to fit within a limited workspace and may be stored out of the way when not in use.

Figure 5:
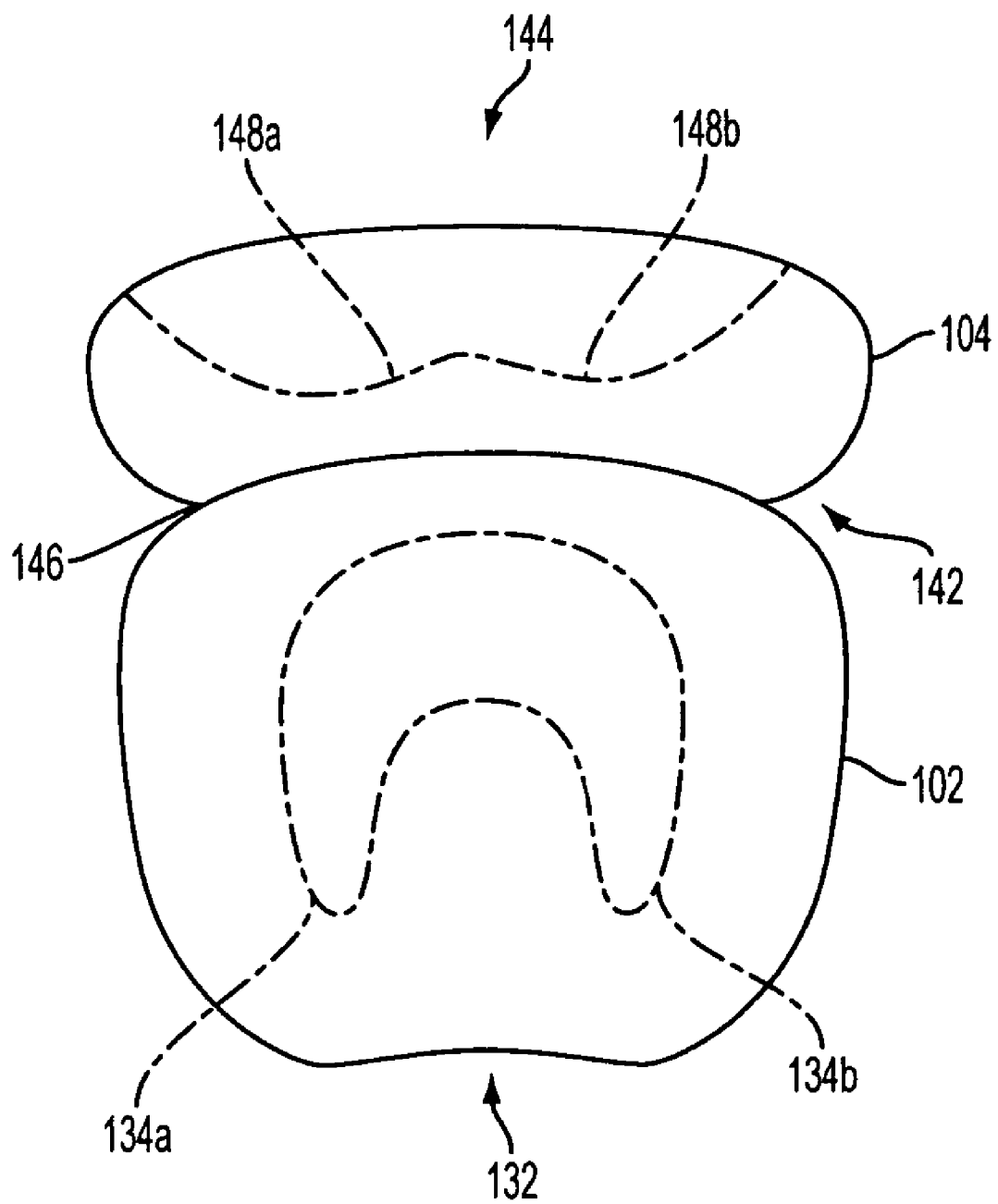
FIG. 5 is a top view of a seat and back of a multi-position chair, consistent with one embodiment of the present invention.

Referring to FIG. 5, exemplary shapes of the seat 102 and the back 104 are described in greater detail. The seating surface 132 of the seat 102 may be shaped to conform to the buttocks region of a user's anatomy. For example, the seating surface 132 may include depressions 134a, 134b. The front seating surface 142 of the back 104 may be advantageously shaped to conform ergonomically to the upper and lower back regions of a user's anatomy. For example, the front leaning surface 142 may include a lumbar support portion 146. The rear leaning surface 144 of the back 104 may be advantageously shaped to conform ergonomically to the buttocks region of a user's anatomy. For example, the rear leaning surface 144 may include depressions 148a, 148b.

Other shapes of the seat 102 and back 104 are also within the scope of the present invention. The rear leaning surface 144 of the back 104, for example, may include only a single depression extending across the width of the back 104 to receive the buttocks of a user. The seat 102 and/or the back 104 may also include an adjustable shape. For example, the back 104 may include an adjustable lumbar support (not shown) having vertical and/or depth control.

The seat 102 and the back 104 may be made of memory foam or other suitable materials. One example of a memory foam is a high density moldable memory foam such as the type available under the name BISCO. The memory foam advantageously conforms to the contour of the users body (e.g., to the back or the buttocks). The memory foam may be covered by a covering material such as fabric, leather or other such material.

According to one embodiment, the support 106 may include a vertical support 150 extending from the seat 102 and a base 152 coupled to the vertical support 152 (see FIGS. 1 and 2). The vertical support 150 may include a foot rest 154 that may be adjusted and moved by the user. The base 152 may include radially extending members 160 having casters 162. One or more of the casters 162 may be spring-loaded and one or more of the radially extending members 160 may include a gripping surface 164 (e.g., having teeth or other sharp protrusions) that grips against the floor when a force is applied to the chair 100 (e.g., when the user is leaning). One example of the casters 1162 may include reverse locking casters that are commercially available and known to those skilled in the art.

Figure 6:
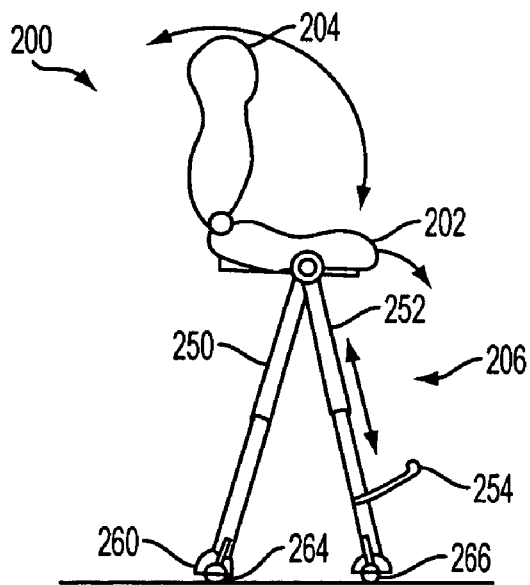
FIGS. 6-8 are side views of another embodiment of a multi-position chair in various positions.
Figure 7:
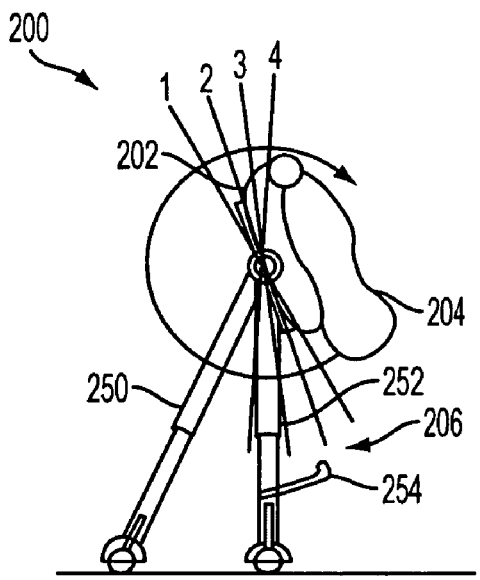
Figure 8:
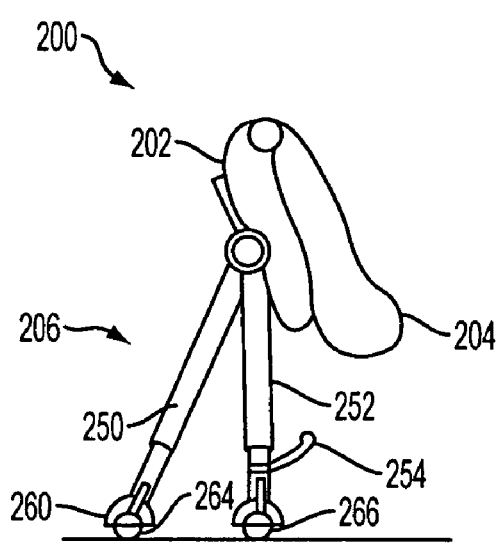
Figure 9:
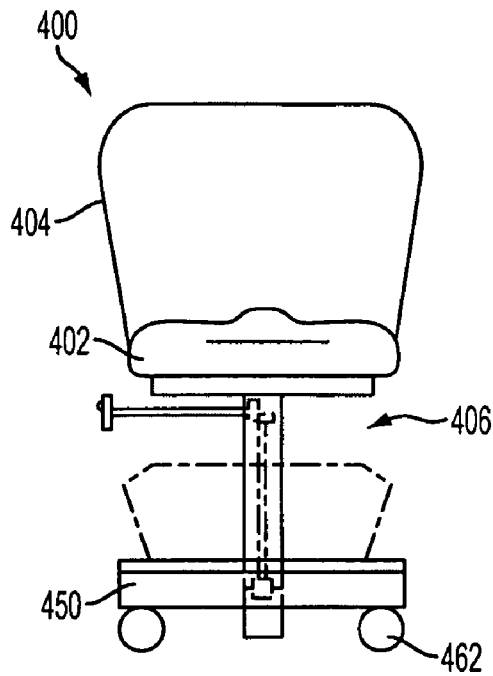
FIG. 9 is a side view of a further embodiment of a multi-position chair in a sitting position.
Figure 10:
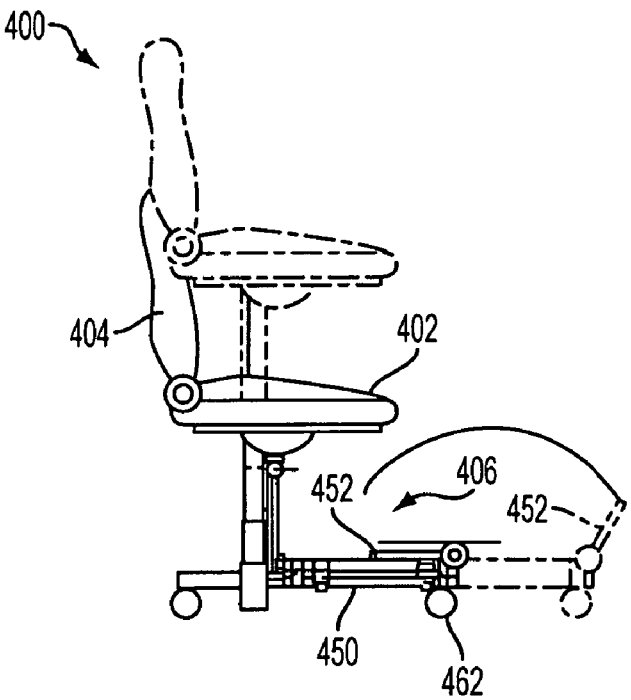
FIGS. 10 and 11 are side views of the multi-position chair shown in FIG. 9 in different sitting and leaning positions, respectively.

Referring to FIGS. 6-8, another embodiment of a multi-position chair 200 is shown and described. The chair 200 includes a seat 202, a back 204 and a support 206 pivotably coupled together, as described above, to be positioned in a sitting position (FIG. 6), a leaning position (FIG. 7) and a storage position (FIG. 8). According to this embodiment, the support 206 includes legs 250, 252 extending from the seat 202. The legs 250, 252 may be adjustable (e.g, using pistons) to adjust the height of the chair 200. The legs 250, 252 may include casters 264, 266 to allow the legs 250, 252 to roll along the floor. One or more of the casters 264 may be spring loaded and one or more of the legs 250 may include a gripping surface 260 such that the gripping surface 260 contacts and grips the floor when the user applies weight to the chair 200. A foot rest 254 may be coupled to one leg 252.

Figure 11:
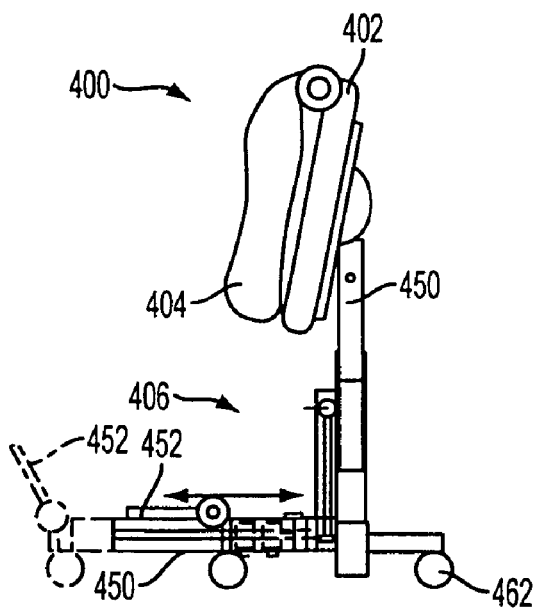
Figure 12:
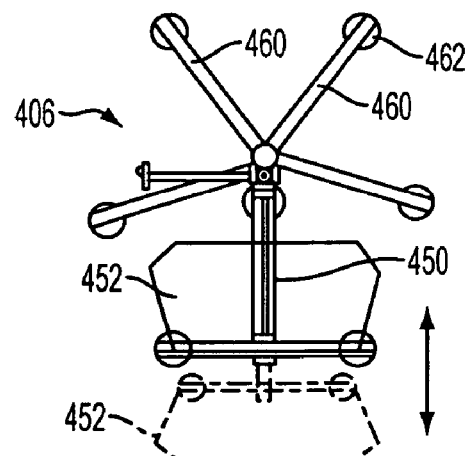
FIG. 12 is a top view of a support for the multi-position chair shown in FIG. 9.

Referring to FIGS. 9-12, another embodiment of a multi-position chair 400 is shown and described. The chair 400 includes a seat 402, a back 404, and a support 406 pivotably coupled together, as described above, to be positioned in a sitting position (FIGS. 9 and 10), a leaning position and a storage position (FIG. 11). According to this embodiment, the support 406 includes a base 450 having a platform 452 for receiving the user's feet. Thus, the force applied by the user's feet on the platform 452 will stabilize the chair 400 when used in a leaning position. The base 450 may include an adjusting mechanism, allowing the base 450 to be adjusted to different lengths (e.g. for storage). The support 406 may also include radially extending portions 460 and casters 462.

Figure 13:
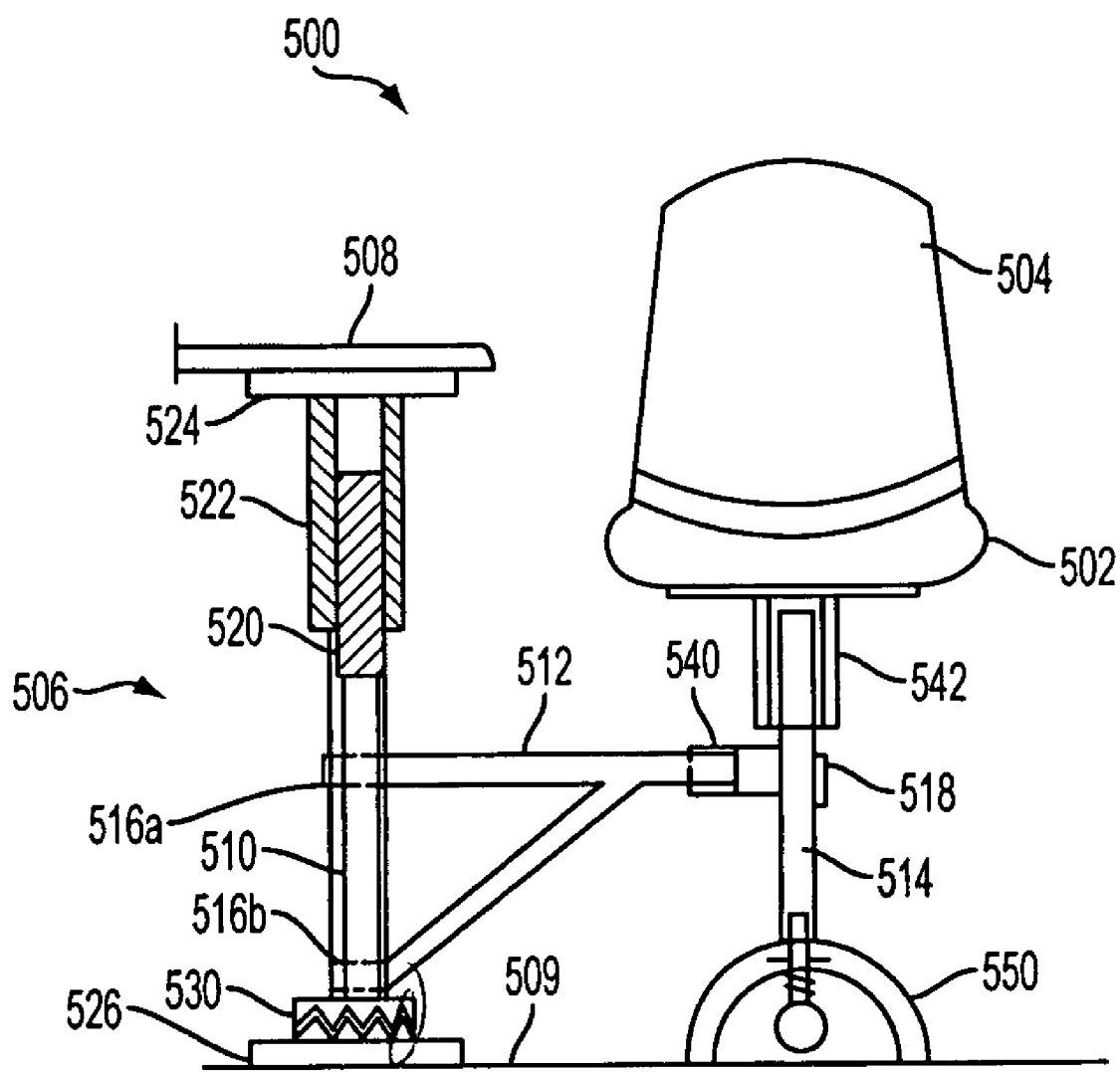
FIG. 13 is a front view of yet another embodiment of a multi-position chair in a sitting position.

Referring to FIG. 13, yet another embodiment of a multi-position chair 500 includes a seat 502 and a back 504, similar to those described above, and a support 506 coupled to a counter top 508 of a console or desk. The support 506 may include a main vertical column 510 secured between the counter top 508 and the floor 509 and a horizontal support arm 512 extending from the main vertical column 510 to a chair column 514. The horizontal support arm 512 may include pin roller bearings 516a, 516b at the main vertical column 510 and pin roller bearing 518 at the chair column 514, allowing the chair to rotate freely about the center point defined by the main vertical column 510.

The main vertical column 510 may include a first column portion 520 threaded into a second column portion 522 secured to the counter top 508. The second column portion 522 may be secured to an integral top plate 524, which may be affixed to the underside of the counter top 504 (e.g., by adhering, bolting and/or screwing). The main vertical column 510 may also extend to an integral floor plate 526, which may be affixed to the floor surface (e.g., by adhering, bolting and/or screwing). The top plate 524 and the bottom plate 526 may be designed to help distribute forces or vector loads resulting from a person sitting on or leaning into the chair 500.

A rotation locking device 530 may be coupled between the main vertical column 510 and the floor plate 526. The rotation locking device 530 may include top and bottom rings including teeth separated by a spring, which will compress under load placed on the chair 500 and lock together even after the load is removed. The locking rings may be opened by a release mechanism (not shown) that is actuated by an action of the operator (e.g., a foot pedal actuator). The top and bottom locking rings, respectively, of the rotation locking device 530 may be coupled to the main vertical column 510 and to the integral floor plate 526 coupled to the floor 509. The rotation locking device 530 allows the user to adjust the rotational swing of the chair 500. The locking device 530 may provide for adjustments in 10 degree increments, although finer adjustments may be accomplished by changing the top and bottom locking rings containing more teeth.

A horizontal adjustment device 540 may be provided to allow the chair 500 to move in a horizontal plane. Using the horizontal adjustment device 540, a user may adjust the user's position relative to an input device such as a keyboard. A vertical adjustment device 542 may be provided to allow the height of the chair 500 to be adjusted relative to the floor, for example, to move the chair between a sitting position and leaning position or between lower and higher sitting positions. A footer 550 at one end of the chair column 514 locks to the floor 509 to prevent slippage of the chair 500 in a rearward direction when the user sits or leans against the chair. The footer 550 may include spring loaded casters and gripping surfaces, for example, as described above.

Although the embodiments shown include specific configurations for the multi-position chairs and the supports, those skilled in the art will recognize that other configurations may be used to support and stabilize the chair and to allow adjustment of the chair.

In summary, a multi-position chair may include a support, a seat pivotably coupled to the support, and a back pivotably coupled to said seat. The seat and the back are configured to be positioned in at least one sitting position and at least one leaning position. The back may include a front seating surface configured to receive a back of a user in a sitting position and a rear leaning surface configured to receive buttocks of the user in a leaning position.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A multi-position chair comprising:
    a support;
    a seat pivotably coupled to said support; and
    a back pivotably coupled to said seat, wherein said seat and said back are configured to be positioned in at least one sitting position and at least one leaning position, said back including a front seating surface configured to receive a back of a user in a sitting position and a rear leaning surface configured to receive buttocks of said user in a leaning position, wherein said seat and said back are configured to be folded together and angled downward such that said rear leaning surface of said back is positioned to receive said buttocks of said user in said leaning position.

2. The multi-position chair of claim 1 wherein said seat and said back are configured to be positioned in at least one storage position.

3. The multi-position chair of claim 1 wherein said support includes an adjustment mechanism to adjust a height of said seat and said back.

4. The multi-position chair of claim 1 wherein said support comprises a base for supporting said seat and said back relative to a floor.

5. The multi-position chair of claim 4 wherein said base comprises a gripping portion configured to grip said floor when a force is applied to said support toward said floor.

6. The multi-position chair of claim 5 further comprising at least one spring-loaded caster coupled to said base.

7. The multi-position chair of claim 4 wherein said base comprises a platform configured to receive feet of a user when a user when a user is sitting on said seat or leaning against said back.

8. The multi-position chair of claim 7 wherein said platform is adjustable between at least a first position for receiving the feet of the user when the user is sitting on said seat to at least a second position for receiving the feet of the user when the user is leaning against said back.

9. The multi-position chair of claim 1 wherein said support includes a plurality of legs extending from said seat.

10. The multi-position chair of claim 1 wherein said seat and said back are pivotably adjustable relative to said support and configured for a plurality of leaning positions at different angles.

11. The multi-position chair of claim 1 wherein said seat and said back comprise memory foam.

12. A multi-position chair comprising:
    a seat;
    a back pivotably coupled to said seat, wherein said seat and said back are configured to be positioned in at least one sitting position, at least one leaning position and at least one storage position, wherein said back includes a front seating surface configured to receive a back of a user in said sitting position and a rear leaning surface configured to receive buttocks of said user in said leaning position, and wherein said seat and said back are configured to be folded together and angled downward such that said rear leaning surface of said back is positioned to receive said buttocks of said user in said leaning position, and wherein said seat and said back are configured to be folded together for positioning in said storage position; and
    a support pivotably supporting said seat, wherein said support is configured to contact a floor and to prevent horizontal movement of the chair in said at least one leaning position.

13. The multi-position chair of claim 12 wherein said rear leaning surface of said back includes depressions shaped to conform to said buttocks of said user.

14. The multi-position chair of claim 12 wherein said support includes an adjustment mechanism to adjust a height of said seat and said back.

15. The multi-position chair of claim 12 wherein said support comprises a base for supporting said seat and said back relative to a floor.

16. The multi-position chair of claim 15 wherein said base comprises a gripping portion configured to grip said floor when a force is applied to said support toward said floor.

17. The multi-position chair of claim 16 further comprising at least one spring-loaded caster coupled to said base.

18. The multi-position chair of claim 1 wherein said rear leaning surface of said back includes depressions shaped to conform to said buttocks of said user.

* * * * *